United States Patent
Takada (10) Patent No.: US 12,441,252 B2
(45) Date of Patent: Oct. 14, 2025

(54) STORAGE AND OFF-ROAD VEHICLE

(71) Applicant: Kawasaki Motors, Ltd., Hyogo (JP)

(72) Inventor: Kenta Takada, Akashi (JP)

(73) Assignee: KAWASAKI MOTORS, LTD., Hyogo (JP)

( * ) Notice: Subject to any disclaimer, the term of this patent is extended or adjusted under 35 U.S.C. 154(b) by 256 days.

(21) Appl. No.: 17/851,090

(22) Filed: Jun. 28, 2022

(65) Prior Publication Data
US 2023/0415659 A1   Dec. 28, 2023

(51) Int. Cl.
B60R 7/06 (2006.01)

(52) U.S. Cl.
CPC ................... B60R 7/06 (2013.01)

(58) Field of Classification Search
CPC ....... B60R 7/06; B60R 16/0215; B60R 16/03; B60R 7/04; B60R 2011/0007; B60R 2011/0036; B60K 37/04; B60K 2370/46; B60K 2370/61; B60Y 2200/20; E05F 1/1276; E05F 1/1075
USPC ...................................... 296/37.12
See application file for complete search history.

(56) References Cited

U.S. PATENT DOCUMENTS

| | | | | |
|---|---|---|---|---|
| 5,630,630 A | * | 5/1997 | Price ...................... | E05B 83/30 292/336.3 |
| 7,571,952 B1 | * | 8/2009 | Hamaguchi ............ | B62D 33/06 280/748 |
| 7,603,881 B2 | * | 10/2009 | Yukihara .................. | E05B 5/00 292/216 |
| 10,336,409 B1 | * | 7/2019 | Girard ..................... | B63B 34/10 |
| 2004/0041426 A1 | * | 3/2004 | Lee .......................... | B60N 3/12 296/37.12 |
| 2006/0054630 A1 | * | 3/2006 | Katagiri ................... | B60R 7/06 220/812 |
| 2006/0208506 A1 | * | 9/2006 | Kern ....................... | E05B 77/42 292/304 |
| 2007/0176455 A1 | * | 8/2007 | Kataoka ................... | B60R 5/02 296/70 |
| 2008/0007081 A1 | * | 1/2008 | Shibata .............. | E05B 47/0009 70/158 |
| 2010/0001539 A1 | * | 1/2010 | Kikuchi .................. | E05B 77/06 292/138 |
| 2010/0314182 A1 | | 12/2010 | Crain et al. | |
| 2017/0144613 A1 | * | 5/2017 | Catlin ................. | B60R 11/0241 |
| 2018/0202202 A1 | * | 7/2018 | Celis Torres ............. | B60R 5/04 |
| 2020/0331400 A1 | * | 10/2020 | Hodgson ............... | E05C 19/022 |
| 2021/0031698 A1 | * | 2/2021 | Fujiwara ................. | B60R 7/04 |
| 2021/0188184 A1 | * | 6/2021 | Kelso ........................ | B60R 9/06 |
| 2022/0378957 A1 | * | 12/2022 | Hanney ..................... | B60R 7/04 |
| 2023/0114092 A1 | * | 4/2023 | Nakaoka ............... | B60K 35/50 296/37.12 |

(Continued)

FOREIGN PATENT DOCUMENTS

| | | | | |
|---|---|---|---|---|
| DE | 10301748 A1 | * | 7/2004 | ............... B60R 7/04 |
| WO | WO-2012001306 A1 | * | 1/2012 | ............... B60R 7/04 |
| WO | WO-2012114016 A1 | * | 8/2012 | ............... B60R 7/04 |

*Primary Examiner* — Gregory A Blankenship
(74) *Attorney, Agent, or Firm* — XSENSUS LLP (57) ABSTRACT

A storage 3 of a utility vehicle 100 includes a storage body 4 in a vehicle body 10, the storage body 4 including a housing space 40; a lid 5 opening or closing the housing space 40; a supporter 6 supporting the lid 5 such that the lid 5 is rotatable relative to the storage body 4; and a spring 7 biasing the lid in a direction in which the lid 5 closes the housing space 40.

10 Claims, 10 Drawing Sheets

(56) References Cited

U.S. PATENT DOCUMENTS

2024/0044189 A1\* 2/2024 Toriumi ................. E05C 9/043

\* cited by examiner

STORAGE AND OFF-ROAD VEHICLE

FIELD

The technique of the present disclosure relates to a storage and an off-road vehicle.

BACKGROUND

Typically, an off-road vehicle including a storage has been known. For example, Patent Document 1 (U.S. Patent Application Publication No. 2010/0314182) discloses a storage with a lid. The lid opens or closes a housing space of the storage. Great vibration is caused at the off-road vehicle, and for this reason, the lid is maintained in a fully-closed state by engagement with, e.g., a grommet.

SUMMARY

However, in the storage of Patent Document 1, the grommet is substantially at the center of the housing space of the storage, and for this reason, the grommet might interfere with the action of taking an object in or out of the housing space. Thus, it is difficult to effectively utilize a space at the rear of the grommet in the housing space. That is, an effective volume of the storage is decreased by the grommet.

The technique of the present disclosure has been made in view of the above-described points, and an object of the present disclosure is to maintain a lid in a fully-closed state while increasing; an effective volume of a storage.

A storage of an off-road vehicle according to the present disclosure includes a storage body in a vehicle body, the storage body including an open housing space; a lid opening or closing the housing space; a supporter supporting the lid such that the lid is rotatable relative to the storage body; and an elastic member biasing the lid to a fully-closed state in which the housing space is closed with the lid. The "off-road vehicle" described herein means a vehicle suitable for traveling off road, and includes not only a vehicle dedicated to off-road traveling but also a vehicle that can travel on and off road.

An off-road vehicle of the present disclosure includes a vehicle body and a storage in the vehicle body. The storage includes a storage body in the vehicle body, the storage body including a housing space; a lid opening or closing the housing space; a supporter supporting the lid such that the lid is rotatable relative to the storage hotly; and an elastic member biasing the lid in a direction in which the lid closes the housing space.

According to the storage, the lid can be maintained in the fully-closed state while the effective volume of the storage is increased.

DESCRIPTION OF EMBODIMENTS

Figure 1:
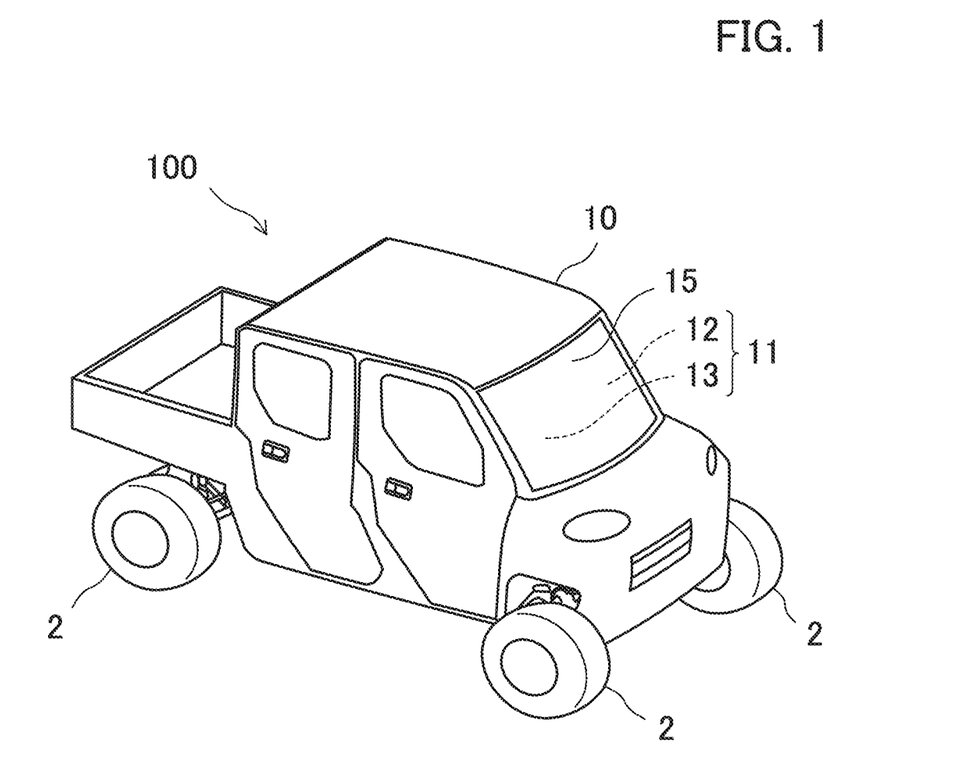
FIG. 1 is a perspective view of a utility vehicle.

Hereinafter, an exemplary embodiment will be described in detail based on the drawings FIG. 1 is a perspective view of a utility vehicle 100.

The utility vehicle 100 includes a vehicle body 10 and a storage 3. The vehicle body 10 includes four wheels 2. Four wheels 2 include two front wheels 2 and two rear wheels 2. A vehicle compartment 11 including at least a driver seat 12 and a passenger seat 13 is in the vehicle body 10. Note that in this example, the driver seat 12 is located on a left side in a vehicle width direction, and the passenger seat 13 is located on a right side in the vehicle width direction. The utility vehicle 100 is one example of an off-road vehicle.

Unless otherwise specified, upper and lower sides each indicate upper and lower sides in a vehicle up-down direction below. Front and rear sides each indicate front and rear sides in a vehicle front-rear direction. The right and left sides each indicate right and left sides when facing forward of the vehicle.

Figure 2:
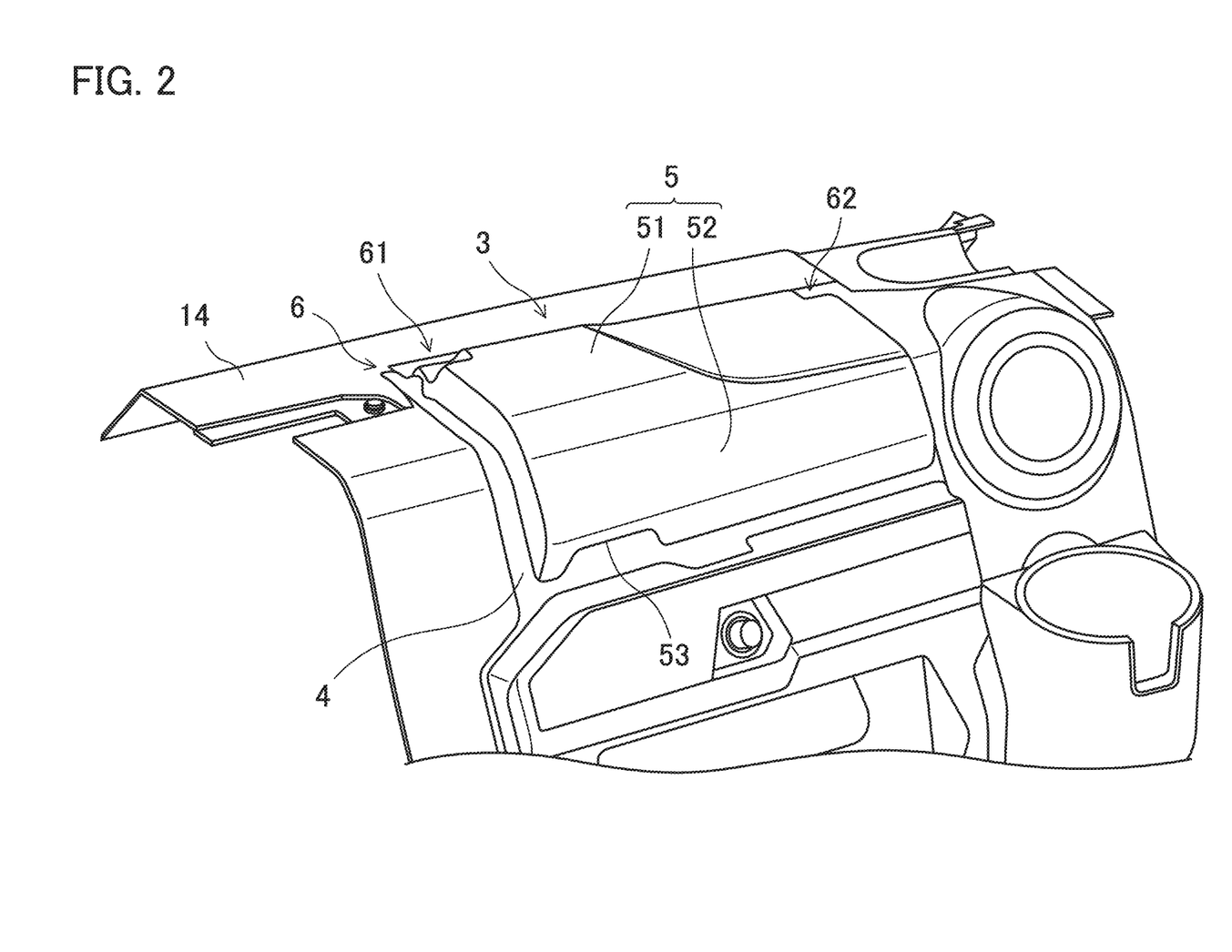
FIG. 2 is a perspective view of part of a dashboard, and shows a storage with a lid fully closed.
Figure 3:
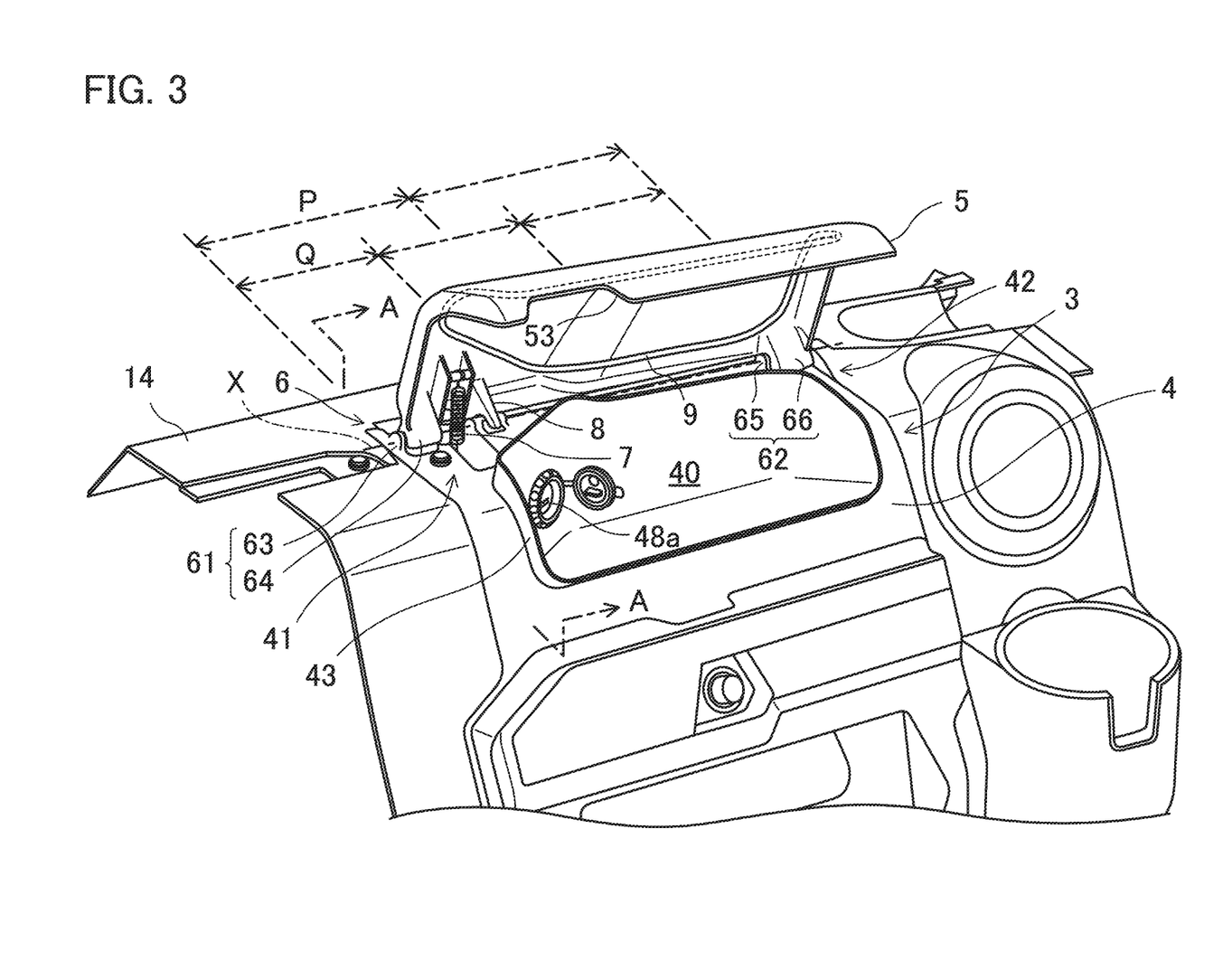
FIG. 3 is a perspective view of part of the dashboard, and shows the storage with the lid fully opened.

FIG. 2 is a perspective view of part of a dashboard 14, and shows the storage 3 with a lid 5 fully closed. FIG. 3 is a perspective view of part of the dashboard 14, and shows the storage 3 with the lid 5 fully opened. The dashboard 14 is in the vehicle compartment 11 of the vehicle body 10. The dashboard 14 and a windowshield 15 (see FIG. 1) together define the front of the vehicle compartment 11. The storage 3 is in the dashboard 14. The storage 3 may be a so-called glove compartment. For example, the storage 3 is, in the dashboard 14, located at a position at the center in the vehicle width direction or a position offset to the passenger seat 13 with respect to the center in the vehicle width direction.

The storage 3 includes a storage body 4, the lid 5, a supporter 6, a spring 7, a spacer 8, and a seal 9.

The storage body 4 is in the vehicle body 10. Specifically, the storage body 4 is in the dashboard 14. That is, the storage body 4 is part of the dashboard 14. The storage body 4 is, in the dashboard 14, located at a position at the center in the vehicle width direction or a position offset to the passenger seat 13 with respect to the center in the vehicle width direction. The storage body 4 has a portion facing substantially upward and a portion facing substantially rearward, i.e., facing an occupant, and is curved as a whole. A housing space 40 recessed outward of the vehicle compartment 11 is in the storage body 4. The housing space 40 opens to the vehicle compartment 11. A rib 43 which is an opening edge of the housing space 40 is at the storage body 4. The rib 43 is in an annular shape.

The lid 5 opens or closes the housing space 40. The lid 5 has such a shape that the lid 5 fully covers the housing space

40. The lid 5 is attached to the storage body 4 through the supporter 6. The lid 5 is substantially in a quadrangular shape. A front edge of the lid 5 is attached to the storage body 4 through the supporter 6. In a fully-closed state of the lid 5, the lid 5 is entirely curved along the dashboard 14 such that a front portion 51 thereof faces substantially upward and a rear portion 52 thereof faces substantially rearward, i.e., facing the occupant.

A grip 53 for opening or closing the lid 5 by the occupant is at the lid 5. The grip 53 is in a cutout shape at a rear edge of the lid 5.

The supporter 6 supports the lid 5 such that the lid 5 is rotatable relative to the storage body 4. The supporter 6 supports the lid 5 such that the lid 5 is rotatable about a predetermined rotation axis X. In this example, the rotation axis X extends substantially in the vehicle width direction. The supporter 6 includes a first supporter 61 and a second supporter 62. The second supporter 62 is, at the storage body 4, located at a position different from that of the first supporter 61.

Specifically, the storage body 4 includes a first mount portion 41 for mounting the first supporter 61 and a second mount portion 42 for mounting the second supporter 62, The first mount portion 41 and the second supporter 62 are located outside the housing space 40. The first mount portion 41 is located at the front left of the housing space 40. The second mount portion 42 is located at the front right of the housing space 40. The first mount portion 41 and the second mount portion 42 are aligned substantially in the vehicle width direction.

The first supporter 61 and the second supporter 62 are aligned substantially in the direction of the rotation axis X, i.e., the vehicle width direction. That is, an alignment direction in which the first supporter 61 and the second supporter 62 are aligned is the vehicle width direction. In this example, since the first supporter 61 is located at the left of the second supporter 62, the first supporter 61 is located closer to the driver seat 12 than the second supporter 62 is to the driver seat 12.

The first supporter 61 has a first shaft 63 at the storage body 4 and a first holder 64 at the lid 5. The second supporter 62 has a second shaft 65 at the storage body 4 and a second holder 66 at the lid 5. That is, each of the first supporter 61 and the second supporter 62 has a hinge structure. The first supporter 61 and the second supporter 62 have the substantially same basic configuration. That is, the first shaft 63 and the second shaft 65 have the substantially same configuration. The first holder 64 and the second holder 66 have the substantially same configuration. Thus, the configurations of the first shaft 63 and the first holder 64 will be mainly described, and description of the configurations of the second shaft 65 and the second holder 66 will be omitted.

Figure 4:
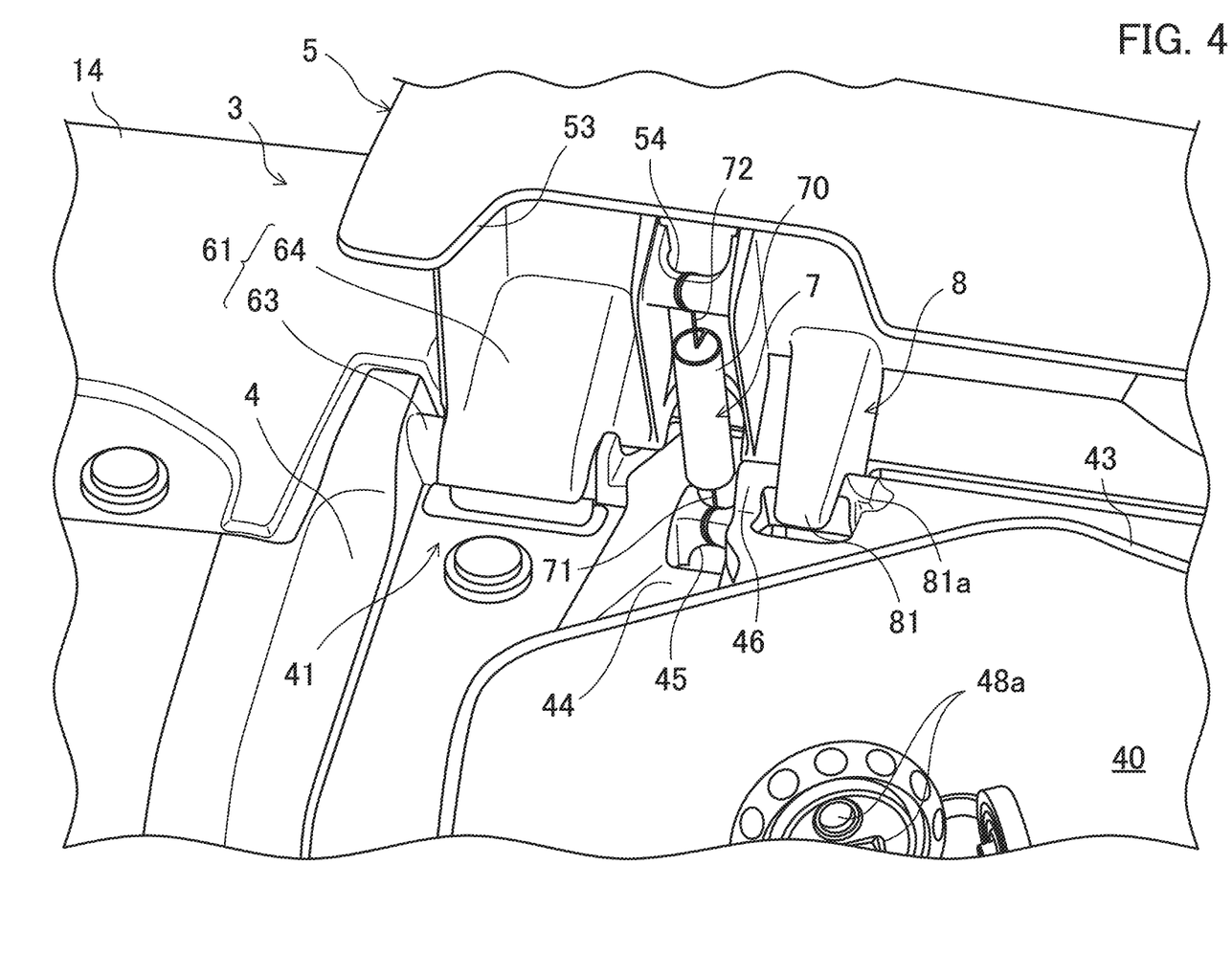
FIG. 4 is a perspective view of a first mount portion.
Figure 5:
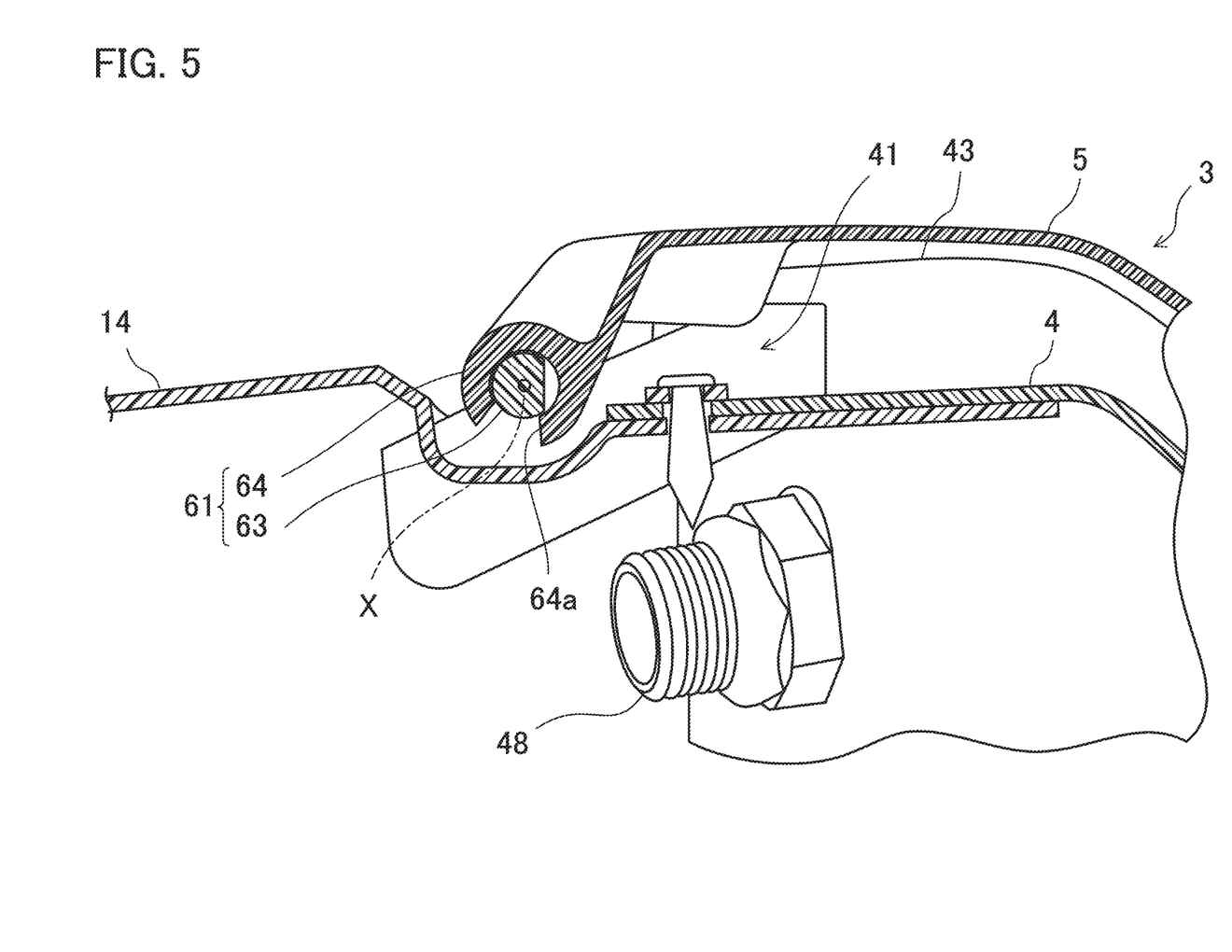
FIG. 5 is an enlarged sectional view of the storage along an A-A line of FIG. 3 around a first supporter, and shows the lid in a fully-closed state.
Figure 6:
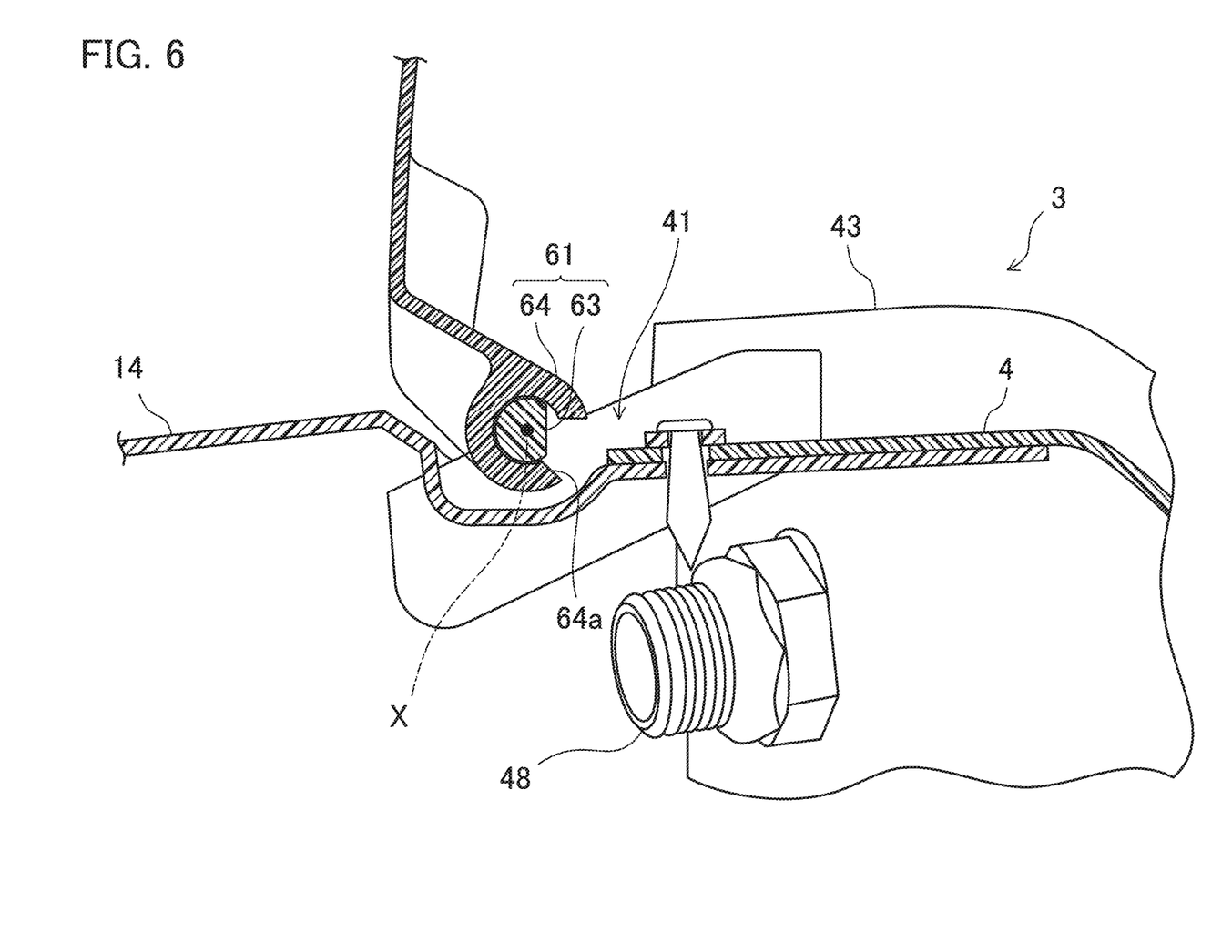
FIG. 6 is an enlarged sectional view of the storage along the A-A line of FIG. 3 around the first supporter, and shows the lid in a fully-open state.

FIG. 4 is a perspective view of the first mount portion 41. FIG. 5 is an enlarged sectional view of the storage 3 along an A-A line of FIG. 3 around the first supporter 61, and shows the fully-closed state of the lid 5. FIG. 6 is an enlarged sectional view of the storage 3 along the A-A line of FIG. 3 around the first supporter 61, and shows a fully-open state of the lid 5, As shown in FIG. 4, the first shaft 63 is located at the first mount portion 41. The position of the first shaft 63 in the vehicle width direction is the substantially same as a left end of the housing space 40. The first shaft 63 is substantially in a columnar shape. Specifically, as shown in FIGS. 5 and 6, the first shaft 63 is in a shape obtained by cutting of part of a column along a plane parallel with the axis of the first shaft 63, i.e., a shape obtained by D-cutting of the column. The axis of the first shaft 63 is coincident with the rotation axis X, The first holder 64 is at a front left corner of the lid 5 in the fully-closed state.

The first holder 64 is substantially in a cylindrical shape. Specifically, the first holder 64 is in such a shape that part of a cylinder is cut out by a slit 64a extending in an axis direction. The axis of the first holder 64 extends substantially in the vehicle width direction. The inner diameter of the first holder 64 is substantially equal to or slightly greater than the outer diameter of the first shaft 63.

The first holder 64 is fitted onto the first shaft 63. The first holder 64 is mounted onto the first shaft 63 with the slit 64a of the first holder 64 positioned at the minimum width portion, which is formed by D-cutting, of the first shaft 63. The first holder 64 rotatable holds the first shaft 63.

As shown in FIG. 3, the second shaft 65 is located at the second mount portion 42. The position of the second shaft 65 in the vehicle width direction is substantially the same as a right end of the housing space 40. The second shaft 65 is located such that the second shaft 65 and the first shaft 63 are aligned substantially in the vehicle width direction. The axis of the second shaft 65 and the axis of the first shaft 63 are on a straight line. That is, the axis of the second shaft 65 is also coincident with the rotation axis X.

The second holder 66 is at a front right corner of the lid 5 in the fully-closed state. The axis of the second holder 66 and the axis of the first holder 64 are on a straight line.

The first holder 64 holds the first shaft 63 such that the first shaft 63 is rotatable about the rotation axis X, and the second holder 66 holds the second shaft 65 such that the second shaft 65 is rotatable about the rotation axis X. With this configuration, the first supporter 61 and the second supporter 62 support the lid 5 on the storage body 4 such that the lid 5 is rotatable about the rotation axis X.

The spring 7 biases the lid 5 to the fully-closed state in which the lid 5 closes the housing space 40. In this example, the spring 7 is a coil spring, more specifically a helical tension spring. As shown in FIG. 4, the spring 7 has a spring body 70, a first end portion 71 extending from the spring body 70, and a second end portion 72 extending from the spring body 70. That is, one of both end portions extending from the spring body 70 is the first end portion 71, and the other end portion is the second end portion 72. The spring 7 is mounted in a pulled state, and produces elastic force in a compression direction. The spring 7 is one example of an elastic member.

As shown in FIG. 3, the spring 7 is located closer to the first supporter 61 than to the second supporter 62. That is, the spring 7 is located at a position offset to the first supporter 61 with respect to the center of the lid 5 in the vehicle width direction. In other words, the spring 7 is located in a region P on a first supporter 61 side in a case where the lid 5 is cut in half in the vehicle width direction. Preferably, the spring 7 is located in a region Q closest to the first supporter 61 in a case where the lid 5 is cut into three regions in the vehicle width direction. In this example, the spring 7 is located at the first mount portion 41. The spring 7 is located on the right side next to the first supporter 61.

As shown in FIG. 4, the first end portion 71 of the spring 7 is attached to the storage body 4, and the second end portion 72 of the spring 7 is attached to the lid 5. The spring 7 is, in an extended state, attached to the storage body 4 and the lid 5. That is, the spring 7 produces elastic force in a contraction direction.

Specifically, a recessed portion 44 is, at the storage body 4, outside the housing space 40, i.e., outside the rib 43. A first attachment portion 45 to which the spring 7 is attached is at the recessed portion 44. More specifically, the recessed portion 44 and the first attachment portion 45 are located at the first mount portion 41 of the storage body 4. The recessed portion 44 and the first attachment portion 45 are located on the right side next to the first shall 63 at the first mount portion 41. On the other hand, a second attachment portion 54 to which the spring 7 is attached is on an inner surface of the lid 5. The second attachment portion 54 is located on the right side next to the first holder 64. The first end portion 71 of the spring 7 is attached to the first attachment portion 45, and the second end portion 72 of the spring 7 is attached to the second attachment portion 54.

Figure 7:
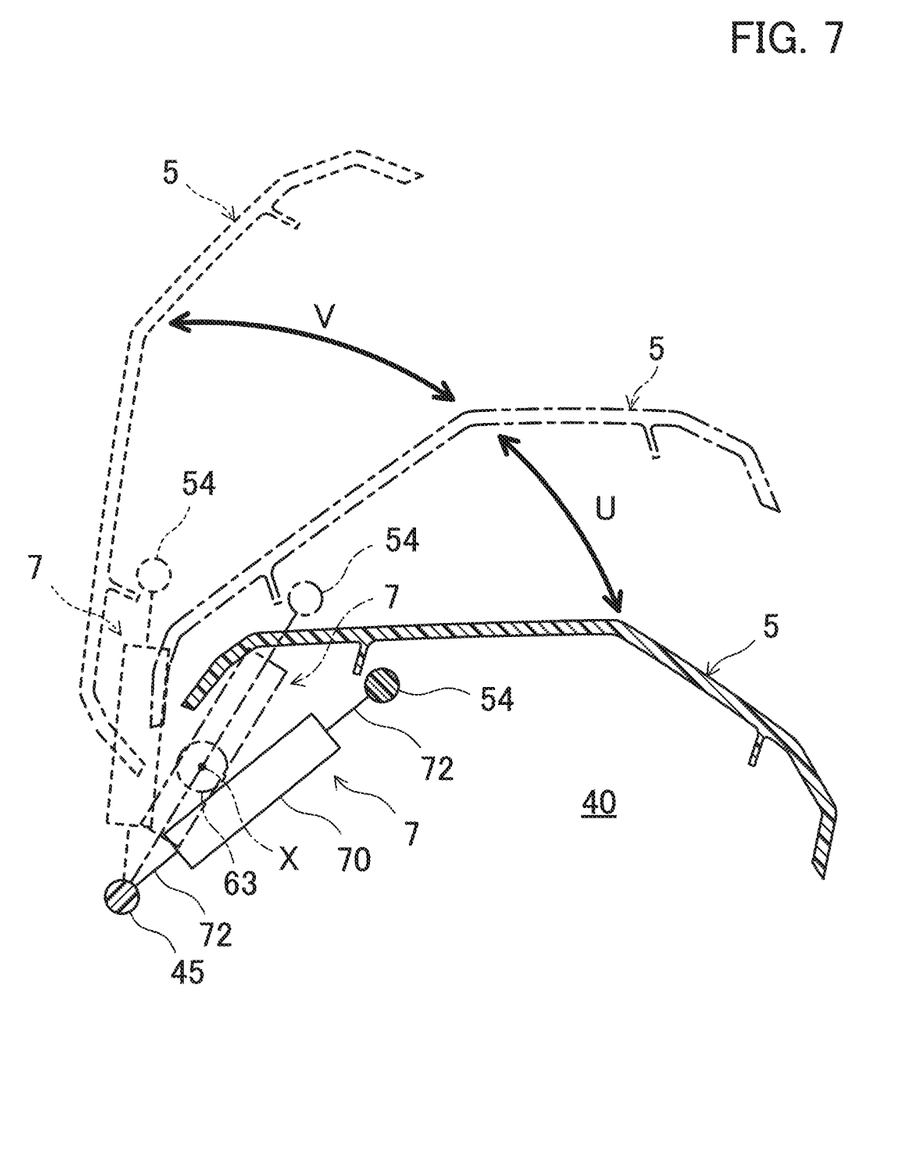
FIG. 7 is a schematic view showing the operation of opening or closing the lid.

The spring 7 biases not only the lid 5 to the fully-closed state, but also biases the lid 5 to the fully-open state. That is, the spring 7 is configured such that a biasing direction is switched according to the state of the lid 5. FIG. 7 is a schematic view showing the operation of opening or closing the lid 5. The lid 5 in FIG. 7 is cut along a plane perpendicular to the axis of the first shaft 63, i.e., the rotation axis X, and passing through the axis of the spring 7. A solid line indicates the fully-closed state of the lid 5, and a dashed line indicates the fully-open state of the lid 5. A chain line indicates a state in which the lid 5 is positioned at a neutral position at which the biasing direction of the spring 7 is switched.

Specifically, the lid 5 rotates between a fully-closed position and a fully-open position. At the fully-closed position indicated by the solid line in FIG. 7, the lid fully closes the housing space 40. At the fully-open position indicated by the dashed line in FIG. 7, the lid 5 is fully opened, i.e., is in the fully-open state. The neutral position is between the fully-closed position and the fully-open position, as indicated by the chain line in FIG. 7. At the neutral position, the axis of the spring 7, i.e., the line passing through the first attachment portion 45 and the second attachment portion 54, is on the rotation axis X. That is, at the neutral position, the axis of the spring 7 is perpendicular to the rotation axis X. During opening or closing of the lid 5, the elastic force of the spring 7 acts on the lid 5 in the contraction direction of the spring 7. The biasing direction of the spring 7 is switched at the neutral position of the lid 5. In a case where the lid 5 is between the fully-closed position and the neutral position, i.e., in a region U in FIG. 7, the spring 7 biases the lid 5 in a closing direction. In a case where the lid 5 is between the fully-open position and the neutral position, i.e., in a region V in FIG. 7, the spring 7 biases the lid 5 in an opening direction.

Specifically, a distance between the first attachment portion 45 and the rotation axis X is shorter than a distance between the first attachment portion 45 and the second attachment portion 54, in the rotation axis region U, the axis of the spring 7 is positioned on a fully-closed position side with respect to the rotation axis X. In the region V, the axis of the spring 7 is positioned on a fully-open position side with respect to the rotation axis X. Thus, the elastic force of the spring 7 acts on the lid 5 in the closing direction in the region U, and acts on the lid 5 in the opening direction in the region V.

The spacer 8 maintains a space between the storage body 4 and the lid 5. The spacer 8 is at one of the storage body 4 or the lid 5, and contacts the other one of the storage body 4 or the lid 5. The spacer 8 constantly contacts the other one of the storage body 4 or the lid 5 during opening or closing of the lid 5. In this example, the spacer 8 is at the lid 5 as shown in FIGS. 3 and 4. The spacer 8 protrudes from the inner surface of the lid 5. A tip end 81 of the spacer 8 contacts the storage body 4.

The spacer 8 is located closer to the first supporter 61 than to the second supporter 62. That is, the spacer 8 is located at a position offset to the first supporter 61 with respect to the center of the lid 5 in the vehicle width direction. In other words, the spacer 8 is located in the region P on the first supporter 61 side in a case where the lid 5 is cut in half in the vehicle width direction. Preferably, the spacer 8 is located in the region Q closest to the first supporter 61 in a case where the lid 5 is cut into three regions in the vehicle width direction. In this example, the spacer 8 is located on the right side next to the spring 7. Specifically, the spring 7 is located between the supporter 6, specifically the first supporter 61, and the spacer 8.

Figure 8:
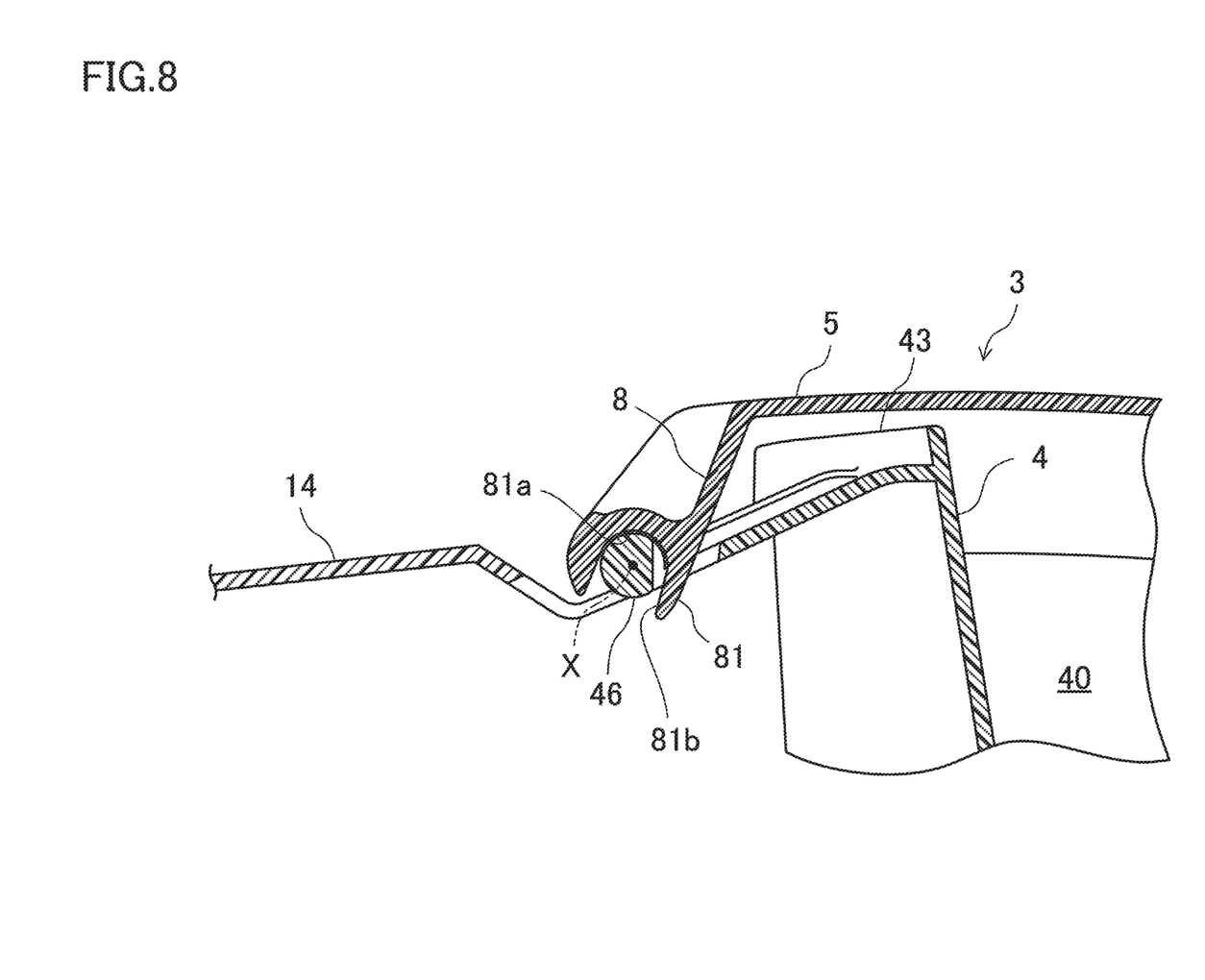
FIG. 8 is an enlarged sectional view of the storage along a plane extending parallel with the A-A line of FIG. 3 and passing through a spacer, and shows the lid in the fully-closed state.
Figure 9:
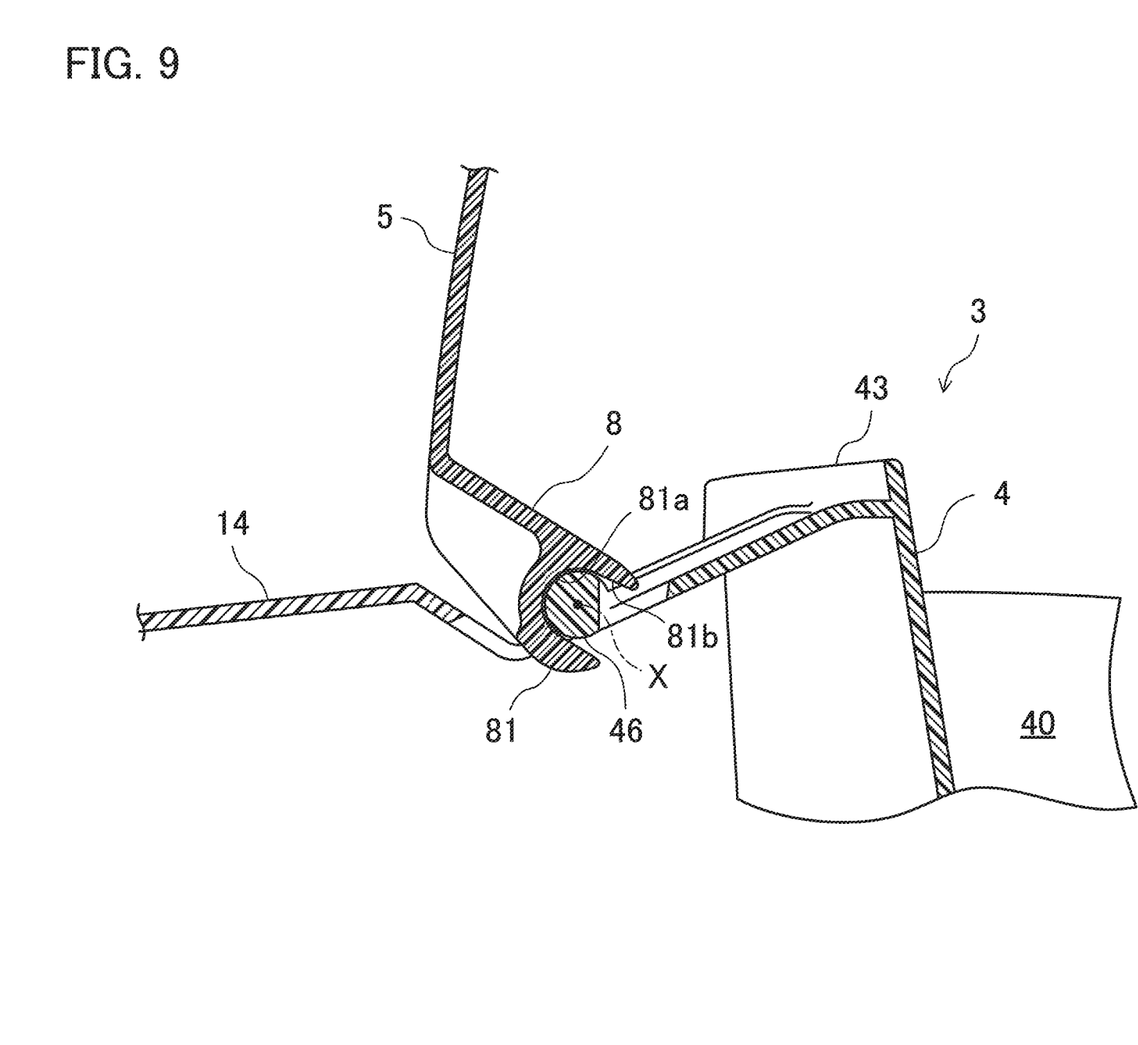
FIG. 9 is an enlarged sectional view of the storage along the plane extending parallel with the A-A line of FIG. 3 and passing through the spacer, and shows the lid in the fully-open state.

FIG. 8 is an enlarged sectional view of the storage 3 along a plane extending parallel with the A-A line of FIG. 3 and passing through the spacer 8, and shows the fully-closed state of the lid 5. FIG. 9 is an enlarged sectional view of the storage 3 along a plane extending parallel with the A-A line of FIG. 3 and passing through the spacer 8, and shows the fully-open state of the lid 5. A recessed portion 81a is at the tip end 81 of the spacer 8. The recessed portion 81a has a curved surface. Specifically, the tip end 81 is substantially in a cylindrical shape. The recessed portion 81a is part of an inner peripheral surface of a cylinder. The tip end 81 is in such a shape that part of the cylinder is cut out by a slit 81b extending in an axis direction. The width of the slit 81b is substantially the same as the diameter of the cylinder part of which is the recessed portion 81a. The recessed portion 81a has a substantially semicircular sectional shape. The axis of the tip end 81 and the axes of the first holder 64 and the second holder 66 are on a straight line.

As shown in FIG. 4, a receiving portion 46 contacting the tip end 81 of the spacer 8 is at the storage body 4. The receiving portion 46 is located at the first mount portion 41. The receiving portion 46 is located on the right side next to the recessed portion 44 for attachment of the spring 7. That is, at the first mount portion 41, the recessed portion 44 is located between the first shaft 63 and the receiving portion 46.

The receiving portion 46 is in a shape corresponding to the tip end 81. In this example, the receiving portion 46 is a shaft. Hereinafter, the receiving portion 46 will be also referred to as a third shaft 46, The third shaft 46 is substantially in a columnar shape as shown in FIGS. 8 and 9. Specifically, the third shaft 46 is in a shape obtained by cutting of part of a column along a plane parallel with the axis of the column, i.e., a shape obtained by D-cutting of the column. The axis of the third shaft 46 is coincident with the rotation axis X. That is, the axis of the third shaft 46 and the axes of the first shaft 63 and the second shaft 65 are on a straight line. The outer diameter of the third shaft 46 is substantially equal to or slightly smaller than the inner diameter of the recessed portion 81a.

The recessed portion 81a of the spacer 8 is fitted onto the third shaft 46. The recessed portion 81a is mounted onto the third shaft 46 with the slit 81b of the recessed portion 81a positioned at the minimum width portion, which is formed by D-cutting, of the third shaft 46. The spacer 8 is rotatable relative to the third shaft 46 with the recessed portion 81a contacting the third shaft 46.

As shown in FIGS. 2 and 3, the grip 53 of the lid 5 is located closer to the first supporter 61 than to the second supporter 62. That is, the grip 53 is, as in the spring 7, located at a position offset to the first supporter 61 with respect to the center of the lid 5 in the vehicle width direction. In other words, the grip 53 is located in the region P on the first supporter 61 side in a case where the lid 5 is cut in half in the vehicle width direction. Preferably, the grip 53 is located in the region Q closest to the first supporter 61 in a case where the lid 5 is cut in three regions in the vehicle width direction. More preferably, the grip 53 at least partially overlap with the spring 7 in the front-rear direction. That is, the position of the grip 53 in the vehicle width direction is at least partially coincident with the position of the spring 7 in the vehicle width direction.

As shown in FIG. 3, the seal 9 seals a clearance between the storage body 4 and the lid 5 in the fully-closed state of the lid 5. The seal 9 is attached to the lid 5. Specifically, the seal 9 is attached to the inner surface of the lid 5, i.e., the surface facing the housing space 40 in the fully-closed state. The seal 9 is, for example, made of rubber or resin.

The seal 9 is, as a whole, in an annular shape corresponding to the rib 43, When the lid 5 is in the fully-closed state, the seal 9 contacts the rib 43, and accordingly, is elastically deformed. The seal 9 seals the housing space 40 by contact with the rib 43.

As shown in FIG. 3, a connector 48a of an electronic component is located in the housing space 40. In the housing space 40, the connector 48a is located closer to the first supporter 61 with respect to the center in the alignment direction in which the first supporter 61 and the second supporter 62 are aligned, That is, the connector 48a is, in the housing space 40, located at a position offset to the first supporter 61 with respect to the center in the vehicle width direction.

Figure 10:
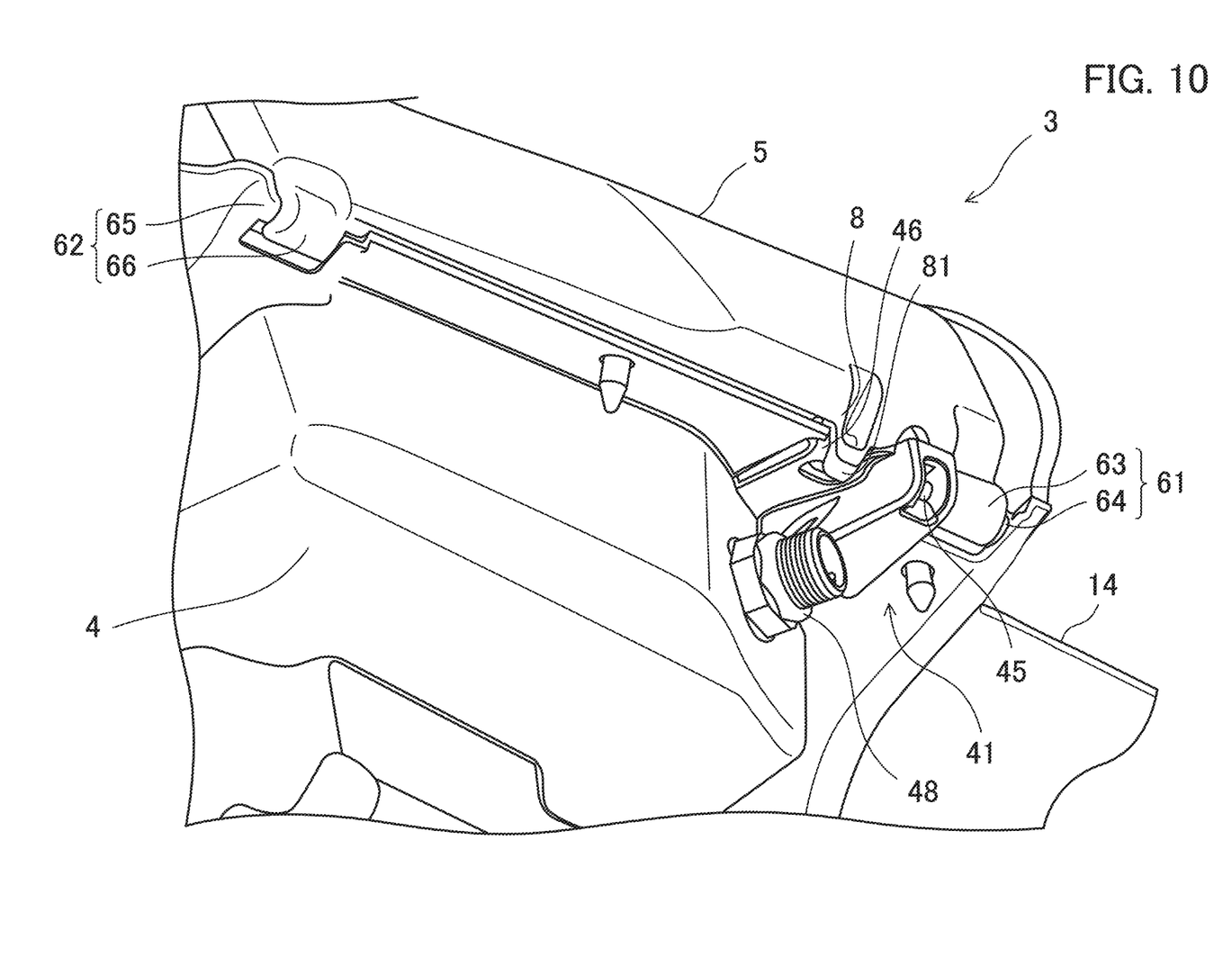
FIG. 10 is a perspective view of the storage from the outside of a vehicle compartment.

FIG. 10 is a perspective view of the storage 3 from the outside of the vehicle compartment 11. A connector assembly 48 having the connector 48a is attached to the storage body 4. A large portion of the connector assembly 48 is located in a space on the opposite side of the storage body 4 from the housing space 40, i.e., a space outside the vehicle compartment U. An opening is in the housing space 40 of the storage body 4, and the connector 48a is exposed to the housing space 40 through the opening. The connector assembly 48 is one example of the electronic component.

At the front left of the housing space 40 at the storage body 4, the first mount portion 41 is located and the first shaft 63 of the first supporter 61, the recessed portion 44 for locating the spring 7, and the receiving portion 46 contacting the spacer 8 are located, as shown in FIG. 4. On the other hand, at the front right of the housing space 40 at the storage body 4, the second mount portion 42 is located, the second shaft 65 of the second supporter 62 is located, and the recessed portion 44, the receiving portion 46, etc. are not located, as shown in FIG. 3. Thus, a portion of the housing space 40 adjacent to the first mount portion 41 is narrower than a portion of the housing space 40 adjacent to the second mount portion 42. Conversely, a relatively-large space is in a region corresponding to the first mount portion 41 on the opposite side of the storage body 4 from the housing space 40. As shown in FIG. 10, the connector assembly 48 is located in this region, i.e., a space on the opposite side of the first mount portion 41 from the vehicle compartment 11.

Next, opening or closing of the storage 3 will be described. In the fully-closed state of the lid 5, the housing space 40 is closed with the lid 5. Further, in the fully-closed state of the lid 5, the seal 9 is elastically deformed to seal the clearance between the storage body 4 and the lid 5. In this state, the lid 5 is maintained in the fully-closed state by the spring 7.

The occupant on the driver seat 12 or the passenger seat 13 grips the grip 53 of the lid 5 to open or close the lid 5. When opening the lid 5, the occupant grips the grip 53, and pulls up the lid 5. At the early stage of opening the lid 5, the spring 7 biases the lid 5 in the closing direction, and for this reason, the occupant needs a certain amount of force to open the lid 5. However, at the neutral position of the lid 5 in an opening/closing stroke, the biasing direction of the spring 7 is switched from the closing direction to the opening direction. After the lid 5 has passed the neutral position, the lid 5 rotates to the fully-open position by the elastic force of the spring 7 even with a small occupant's force of opening the lid 5, The lid 5 is maintained in the fully-open state by the elastic force of the spring 7.

When closing the lid 5, the occupant pushes down the lid 5 in the fully-open state. At the early stage of closing the lid 5, the spring 7 biases the lid 5 in the opening direction, and for this reason, the occupant needs a certain amount of force to close the lid 5. However, at the neutral position of the lid 5 in the opening/closing stroke, the biasing direction of the spring 7 is switched from the opening direction to the closing direction. After the lid 5 has passed the neutral position, the lid 5 rotates to the fully-closed position by the elastic force of the spring 7 even with a small occupant's force of closing the lid 5.

In the storage 3 configured as described above, the lid 5 is held in the fully-closed state only by the spring 7. The vehicle on which the storage 3 is mounted is the utility vehicle 100, and for this reason, there is a probability of, e.g., water or dust entering the vehicle compartment 11. The storage 3 is configured such that the lid 5 prevents water or dust from entering the housing space 40. Particularly, vibration of the utility vehicle 100 is relatively great, and vibration of the vehicle body 10 is also transmitted to the lid 5. However, the lid 5 is maintained in the hilly-closed state by the spring 7, and therefore, opening of the lid 5 by vibration of the vehicle body 10 is prevented.

It is configured such that the biasing direction of the spring 7 is switched between the closing direction and the opening direction. In the fully-open state of the lid 5, the spring 7 biases the lid 5 in the opening direction. That is, the lid 5 is maintained in the fully-open state by the elastic force of the spring 7. Thus, even if vibration of the vehicle body 10 is transmitted to the lid 5 in the fully-open state of the lid 5, the lid 5 can be maintained in the fully-open state.

In the operation of opening or closing the lid 5, the spring 7 switches the biasing direction thereof, thereby assisting occupant's opening/closing operation. Specifically, in opening of the lid 5 from the fully-closed state, after the lid 5 has passed the neutral position, the biasing direction of the spring 7 is switched from the closing direction to the opening direction. Even with a small occupant's operation force, the lid 5 is brought into the fully-open state by the elastic force of the spring 7. On the other hand, in closing of the lid 5 from the fully-closed state, after the lid 5 has passed the neutral position, the biasing direction of the spring 7 is switched from the opening direction to the closing direction. Even with a small occupant's operation force, the lid 5 is brought into the fully-closed state by the elastic force of the spring 7. As described above, the lid 5 is automatically brought into the fully-open state or the fully-closed state by the elastic force of the spring 7, and therefore, the operability of the lid 5 is improved.

For protecting the housing space 40 from, e.g., water or dust, the lid 5 seals the housing space 40 by means of the seal 9. The seal 9 is compressed and deformed when sealing the clearance between the storage body 4 and the lid 5. At this point, elastic force of the seal 9 acts on the lid 5 in the opening direction. However, the elastic force of the spring 7 in the closing direction is greater than the elastic force of the seal 9 in the opening direction, and therefore, the state of sealing the housing space 40 by the lid 5 can be maintained.

The lid 5 is maintained in the fully-closed state only by the spring 7, and therefore, a locking mechanism, such as a grommet, for maintaining the lid 5 in the fully-closed state is not necessary. Thus, an effective volume of the housing space 40 can be increased. Specifically, the spring 7 is located outside the housing space 40. Thus, the spring 7 does not interfere with the action of taking an object in or out of the housing space 40. As a result, the effective volume of the housing space 40 is increased.

The spring 7 is, in the alignment direction of the first supporter 61 and the second supporter 62, located at the position offset to the first supporter 61 with respect to a middle position between the first supporter 61 and the second supporter 62. Since the second end portion 72 of the spring 7 is coupled to the lid 5, the elastic force of the spring 7 acts on the lid 5. In a case where the second end portion 72 of the spring 7 is coupled to the lid 5 at the middle position between the first supporter 61 and the second supporter 62 in the alignment direction thereof, the lid 5 tends to be greatly deformed. As the portion coupled to the second end portion 72 of the spring 7 is positioned closer to any of the first supporter 61 and the second supporter 62, deformation of the lid 5 is smaller. That is, the spring 7 is located on the lid 5 at the position offset to the first supporter 61 with respect to the middle position between the first supporter 61 and the second supporter 62 so that deformation of the lid 5 can be reduced.

In addition, the spacer 8 maintains the space between the storage body 4 and the lid 5, and therefore, deformation of the lid 5 is further reduced. In this example, the lid 5 includes the spacer 8, and the tip end 81 of the spacer 8 contacts the receiving portion 46 of the storage body 4. Even in opening or closing of the lid 5, the spacer 8 constantly contacts the storage body 4. As a result, in the fully-closed or fully-open state of the lid 5 or during opening or closing of the lid 5, the spacer 8 maintains the space between the storage body 4 and the lid 5, thereby reducing deformation of the lid 5.

The spring 7 is located next to the spacer 8. Since the spacer 8 maintains the space between the lid 5 and the storage body 4 in the vicinity of a portion of the lid 5 on which the elastic force of the spring 7 acts, deformation of the lid 5 is more effectively reduced.

The spring 7 is located between the spacer 8 and the first supporter 61. In this example, the spring 7 and the spacer 8 are located at the positions offset to the first supporter 61 with respect to the center of the lid 5 in the vehicle width direction. Specifically, the first supporter 61, the spring 7, and the spacer 8 are located at the first mount portion 41 of the storage body 4. Moreover, the spring 7 is located between the first supporter 61 and the spacer 8. The elastic force of the spring 7 acting on the lid 5 is supported by the first supporter 61 and the spacer 8. Thus, deformation of the lid 5 is further reduced.

In this example, only the elastic force of the spring 7 needs to maintain the lid 5 in the fully-closed state and to elastically compress and deform the seal 9. Thus, the elastic force of the spring 7 in the fully-closed state is relatively great. As described above, the first supporter 61, the spring 7, and the spacer 8 are collectively located at a single location, i.e., located close to each other, Thus, the lid 5 can be protected from the great elastic force of the spring 7.

As described above, the storage 3 of the utility vehicle 100 (the off-road vehicle) includes the storage body 4 in the vehicle body 10, the storage body 4 including the opening housing space 40; the lid 5 opening or closing the housing space 40; the supporter 6 supporting the lid 5 such that the lid 5 is rotatable relative to the storage body 4; and the spring 7 (the elastic member) biasing the lid to the fully-closed state in which the housing space 40 is closed with the lid 5.

The utility vehicle 100 (the off-road vehicle) includes the vehicle body 10 and the storage 3 in the vehicle body 10. The storage 3 includes the storage body 4 in the vehicle body 10, the storage body 4 including the housing space 40; the lid 5 opening or closing the housing space 40; the supporter 6 supporting the lid 5 such that the lid 5 is rotatable relative to the storage body 4; and the spring 7 (the elastic member) biasing the lid 5 in the direction in which the lid 5 closes the housing space 40.

According to these configurations, the lid 5 can be maintained in the fully-closed state by the spring 7, and therefore, a mechanism, such as a grommet, for locking the lid 5 at the storage body 4 is not necessary. Thus, it is not necessary to locate such a locking mechanism in the housing space 40, and therefore, the effective volume of the housing space 40 can be increased.

The spring 7 is located outside the housing space 40.

According to this configuration, since the spring 7 is not located in the housing space 40, the spring 7 does not interfere with the action of taking an object in or out of the housing space 40, and does not cause a decrease in the effective volume of the housing space 40.

The storage 3 further includes the spacer 8 maintaining the space between the storage body 4 and the lid 5.

According to this configuration, deformation of the lid. 5 due to the elastic force of the spring 7 is reduced.

Specifically, the spacer 8 is at one of the storage body 4 or the lid 5, and constantly contacts the other one of the storage body 4 or the lid 5 during opening or closing of the lid 5.

According to this configuration, the spacer 8 constantly maintains the space between the storage body 4 and the lid 5 even during opening or closing of the lid 5. Needless to say, in the fully-open state and fully-closed state of the lid 5, the spacer 8 constantly maintains the space between the storage body 4 and the lid 5. That is, the spacer 8 reduces deformation of the lid 5 across the entire section between the open and closed states of the lid 5.

The spring 7 is located between the supporter 6 and the spacer 8, the first end portion 71 of the spring 7 is attached to the storage body 4, and the second end portion 72 of the spring 7 is attached to the lid 5.

According to this configuration, the elastic force of the spring 7 acts on the portion of the lid 5 attached to the spring 7. Since such a portion is positioned between the supporter 6 and the spacer 8, the elastic force of the spring 7 acting on the lid 5 is supported by the supporter 6 and the spacer 8. As a result, deformation of the lid 5 is further reduced.

The supporter 6 includes the first supporter 61 and the second supporter 62 located at the position different from that of the first supporter 61 at the storage body 4, and the spring 7 is located closer to the first supporter 61 than to the second supporter 62.

According to this configuration, the spring 7 is, at the lid 5, located at the position offset to the first supporter 61 with respect to the middle position between the first supporter 61 and the second supporter 62. Portions of the lid 5 in the vicinity of the first supporter 61 and the second supporter 62 are less deformable due to support by the first supporter 61 and the second supporter 62. On the other hand, portions of the lid 5 in the vicinity of the middle position between the first supporter 61 and the second supporter 62 are more deformable. The spring 7 is located offset as described above so that the portion of the lid 5 on which the elastic force of the spring 7 acts can be offset from the middle position. Accordingly, deformation of the lid 5 can be reduced.

The storage 3 further includes the spacer 8 maintaining the space between the storage body 4 and the lid 5. The spacer 8 is located closer to the first supporter 61 than to the second supporter 62, the spring 7 is located between the first supporter 61 and the spacer 8, the first end portion 71 of the spring 7 is attached to the storage body 4, and the second end portion 72 of the spring 7 is attached to the lid 5.

According to this configuration, the spacer 8 is, at the lid 5, located at the position offset to the first supporter 61 with respect to the middle position between the first supporter 61 and the second supporter 62. That is, a distance between the first supporter 61 and the spacer 8 is shorter than a distance between the second supporter 62 and the spacer 8. Thus, a portion of the lid 5 between the first supporter 61 and the spacer 8 is less deformable as compared to a portion between the second supporter 62 and the spacer 8. The spring 7 is attached to the lid 5 between the first supporter 61 and the spacer 8. As a result, the elastic force of the spring 7 can be received by the first supporter 61 and the spacer 8, and deformation of the lid 5 can be further reduced.

The connector 48a of the connector assembly 48 (the electronic component) is, in the housing space 40, located in the region closer to the first supporter 61 with respect to the middle position in the alignment direction in which the first supporter 61 and the second supporter 62 are aligned.

As described above, the spring 7 or the spacer 8 is located at the position offset to the first supporter 61 with respect to the middle position between the first supporter 61 and the second supporter 62, Thus, at a portion of the storage body 4 positioned outside the housing space 40 and positioned offset to the first supporter 61 with respect to the middle position between the first supporter 61 and the second supporter 62, the region for locating the spring 7 or the spacer 8, i.e., the first mount portion 41, is ensured. The housing space 40 cannot be expanded to the first mount portion 41, but on the other hand, the relatively-large space is ensured at the portion corresponding to the first mount portion 41 on the opposite side of the storage body 4 from the housing space 40. Since the connector 48a is, in the housing space 40, located in the region closer to the first supporter 61 with respect to the middle position in the alignment direction of the first supporter 61 and the second supporter 62, the connector assembly 48 can be located at the portion corresponding to the first mount portion 41 on the opposite side of the storage body 4 from the housing space 40.

The lid 5 includes the grip 53, and the grip 53 is located closer to the first supporter 61 than to the second supporter 62.

According to this configuration, the grip 53 is, as in the spring 7, located at the position offset to the first supporter 61 with respect to the middle position between the first supporter 61 and the second supporter 62. The lid 5 rotates about the rotation axis X extending in the alignment direction of the first supporter 61 and the second supporter 62. That is, in the direction of the rotation axis X of the lid the grip 53 is located closer to the spring 7. If the grip 53 is located at a position apart from the spring 7 in the direction of the rotation axis X of the lid 5, torsional deformation is easily caused at the lid 5 when the occupant grips the grip 53 to operate the lid 5. If the lid 5 is twisted, smooth rotation of the lid 5 about the rotation axis X is interfered. The grip 53 and the spring 7 are located offset to the same side so that torsional deformation of the lid 5 can be reduced, and therefore, smooth rotation of the lid 5 about the rotation axis X can be achieved.

The storage body 4 is in the dashboard 14 of the vehicle body 10, the first supporter 61 and the second supporter 62 are aligned substantially in the width direction of the vehicle body 10, and the first supporter 61 is located closer to the driver seat than the second supporter 62 is to the driver seat.

According to this configuration, since the first supporter 61 is located closer to the driver seat than the second supporter 62 is to the driver seat, the grip 53 located at the position offset to the first supporter 61 with respect to the middle position between the first supporter 61 and the second supporter 62 is located closer to the driver seat. That is, a driver can easily access the grip 53.

The storage 3 further includes the seal 9 sealing the clearance between the storage body 4 and the lid 5 in the fully-closed state of the lid 5.

According to this configuration, the lid 5 receives repulsive force from the seal 9 in the fully-closed state of the lid 5. That is, the spring 7 needs to produce greater elastic force than the repulsive force of the seal 9 for maintaining the fully-closed state of the lid 5. Accordingly, greater elastic force of the spring 7 acts on the lid 5. In this configuration, e.g., mounting of the spacer 8 and offset placement of the spring 7 or the spacer 8 as described above are particularly effective.

The seal 9 is attached to the lid 5.

According to this configuration, since the seal 9 is not present at the storage body 4 in the open state of the lid 5, the action of taking an object in or out of the housing space 40 can be smoothly performed.

The spring 7 switches the biasing direction thereof at the neutral position between the fully-open position at which the lid 5 is fully opened and the fully-closed position at which the lid 5 is fully closed, and biases the lid 5 in the closing direction in a case inhere the lid 5 is positioned between the fully-closed position and the neutral position and biases the lid 5 in the opening direction in a case where the lid 5 is positioned between the fully-open position and the neutral position.

According to this configuration, the spring 7 switches the biasing direction thereof, thereby assisting the occupant's opening/closing operation. Specifically, in opening of the lid 5 from the fully-closed state, after the lid 5 has passed the neutral position, the biasing direction of the spring 7 is switched from the closing direction to the opening direction. Even with a small occupant's operation force, the lid 5 is brought into the fully-open state by the elastic force of the spring 7. Also, in closing of the lid 5 from the fully-open state, after the lid 5 has passed the neutral position, the biasing direction of the spring 7 is switched from the opening direction to the closing direction. Even with a small occupant's operation force, the lid 5 is brought into the fully-closed state by the elastic force of the spring 7. As described above, the lid 5 is naturally brought into the fully-open state or the fully-closed state by the elastic force of the spring 7, and therefore, the operability of the lid 5 is improved.

Other Embodiments

The embodiment has been described above as an example of the technique disclosed in the present application. However, the technique in the present disclosure is not limited to above, and is also applicable to embodiments to which changes, replacements, additions, omissions, etc. are made as necessary. The components described above in the embodiment may be combined to form a new embodiment. The components shown in the attached drawings and described in detail may include not only components essential for solving the problems, but also components that are provided for describing an example of the above-described technique and are not essential for solving the problems. Thus, description of these non-essential components in detail and illustration of these components in the attached drawings shall not be interpreted that these non-essential components are essential.

For example, the off-road vehicle to which the storage 3 is applied is not limited to the utility vehicle 100, The off-road vehicle may be, for example, an all terrain vehicle (ATV) or a tractor. Moreover, the off-road vehicle is not limited to a four-wheeled vehicle, and for example, may be a two-wheeled vehicle.

The location where the storage 3 is provided is not limited to the dashboard 14. The storage 3 may be located at an optional location inside or outside the vehicle compartment 11. For example, the storage 3 may be located in a center console in the vehicle compartment 11, The elastic member biasing the lid 5 to the fully-closed state is not limited to the spring 7. The elastic member may be made of rubber or resin. In a case where the elastic member is a spring, the spring may be a helical torsion spring or a plate spring.

The number of supporters 6 is not limited to two. The supporter 6 may include one supporter 6 or three or more supporters 6. The supporter 6 is not limited to the hinge structure. An optional structure may be employed for the supporter 6 as long as the supporter 6 can support the lid 5 such that the lid 5 is rotatable relative to the storage body 4.

The spacer 8 may be at the storage body 4, and may contact the lid 5. In this case, the receiving portion 46 is at the lid 5. Moreover, the configurations of the tip end 81 of the spacer 8 and the receiving portion 46 are not limited to the configurations of the recessed portion 81a and the third shaft 46 as described above. For example, the tip end 81 may be part of a sphere or a column, and the receiving portion 46 may be a recessed portion in which the sphere or the column rotatable slides.

What is claimed:

1. A storage of an off-road vehicle, comprising:
a storage body in a vehicle body, the storage body including a housing space;
a lid opening or closing the housing space;
a supporter supporting the lid such that the lid is rotatable relative to the storage body; and
an elastic structure biasing the lid in a direction in which the lid closes the housing space; and
a spacer maintaining a space between the storage body and the lid, wherein
the spacer is at one of the storage body or the lid, and constantly contacts an other one of the storage body or the lid during opening or closing movement of the lid.

2. The storage of claim 1, wherein
the elastic structure is located outside the housing space.

3. A storage of an off-road vehicle, comprising:
a storage body in a vehicle body, the storage body including a housing space;
a lid opening or closing the housing space;
a supporter supporting the lid such that the lid is rotatable relative to the storage body; and
an elastic structure biasing the lid in a direction in which the lid closes the housing space; and
a spacer maintaining a space between the storage body and the lid, wherein
the elastic structure is located between the supporter and the spacer,
a first end portion of the elastic structure is attached to the storage body, and
a second end portion of the elastic structure is attached to the lid.

4. A storage of an off-road vehicle, comprising:
a storage body in a vehicle body, the storage body including a housing space;
a lid opening or closing the housing space;
a supporter supporting the lid such that the lid is rotatable relative to the storage body; and
an elastic structure biasing the lid in a direction in which the lid closes the housing space; and
a spacer maintaining a space between the storage body and the lid,
wherein the supporter includes a first supporter and a second supporter located at a position different from that of the first supporter at the storage body,
the spacer is located closer to the first supporter than to the second supporter,
the elastic structure is located closer to the first supporter than to the second supporter and between the first supporter and the spacer,
a first end portion of the elastic structure is attached to the storage body, and
a second end portion of the elastic structure is attached to the lid.

5. The storage of claim 4, wherein
a connector of an electronic component is, in the housing space, located in a region closer to the first supporter with respect to a middle position in an alignment direction in which the first supporter and the second supporter are aligned.

6. The storage of claim 4, wherein
the lid includes a grip, and
the grip is located closer to the first supporter than to the second supporter.

7. The storage of claim 6, wherein
the storage body is in a dashboard of the vehicle body, and
the first supporter is located closer to a driver seat than the second supporter is to the driver seat.

8. The storage of claim 1, further comprising:
a seal sealing a clearance between the storage body and the lid in a fully-closed state of the lid.

9. The storage of claim 8, wherein
the seal is attached to the lid.

10. An off-road vehicle comprising:
a vehicle body; and
a storage in the vehicle body,
wherein the storage includes
a storage body in the vehicle body, the storage body including a housing space,
a lid opening or closing the housing space,
a supporter supporting the lid such that the lid is rotatable relative to the storage body,
an elastic structure biasing the lid in a direction in which the lid closes the housing space, and
a spacer maintaining a space between the storage body and the lid, wherein
the spacer is at one of the storage body or the lid, and constantly contacts an other one of the storage body or the lid during opening or closing movement of the lid.

* * * * *